(12) United States Patent
Kawamoto et al.

(10) Patent No.: US 6,888,599 B2
(45) Date of Patent: May 3, 2005

(54) OPTICAL FILM, AND LIGHTING DEVICE AND IMAGE VIEWING DISPLAY USING THE SAME

(75) Inventors: Ikuo Kawamoto, Ibaraki (JP); Shunsuke Shuto, Ibaraki (JP); Sadahiro Nakanishi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 137 days.

(21) Appl. No.: 10/395,207

(22) Filed: Mar. 25, 2003

(65) Prior Publication Data

US 2004/0189908 A1 Sep. 30, 2004

(30) Foreign Application Priority Data

Mar. 25, 2002 (JP) .......................................... 2002-083806

(51) Int. Cl.$^7$ ............................................. G02F 1/1335
(52) U.S. Cl. ....................................... 349/118; 349/117
(58) Field of Search .................................. 349/117–119

(56) References Cited

U.S. PATENT DOCUMENTS 5,731,886 A 3/1998 Taber et al.
6,630,973 B1 * 10/2003 Matsuoka et al. .......... 349/117

* cited by examiner

*Primary Examiner*—Tarifur R. Chowdhury
*Assistant Examiner*—Richard H Kim
(74) *Attorney, Agent, or Firm*—Westerman, Hattori, Daniels & Adrian, LLP (57) ABSTRACT

An optical film in which at least one layer of a cholesteric liquid crystal layer (1) and a retardation layer (2) are laminated, wherein an in-plane retardation of the retardation layer (2): $(nx_1-ny_1) \times Dre$ is 5 nm or less, and a virtual thickness direction retardation: RZch, and a thickness direction retardation: RZre have a relationship of $RZre/(-RZch) = 0.05$ through 0.35, can be used as a brightness enhancement film, and further that provides an excellent visibility satisfactory also when observed not only from a front direction but from an oblique direction in image viewing displays, such as liquid crystal displays.

15 Claims, 1 Drawing Sheet

OPTICAL FILM, AND LIGHTING DEVICE AND IMAGE VIEWING DISPLAY USING THE SAME

BACKGROUND OF THE INVENTION

1. Field of the Invention

The present invention relates to an optical film. Optical films are used as a brightness enhancement film, and they are further used in combination with other films. Specifically, the present invention relates to a lighting device using the optical film concerned. Furthermore, it relates to an image viewing display in which optical films and the lighting devices are applied, such as a liquid crystal display, an organic electro luminescence display, and a PDP.

2. Description of the Prior Art

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

U.S. Pat. No. 5,731,886 specification describes that a reflective polarizing plate having improved visual angle characteristics may be obtained using a brightness enhancement film in which a liquid crystal layer having homeotropic orientation is arranged between a cholesteric liquid crystal layer and a quarter wavelength plate.

However, when a cholesteric liquid crystal layer is used as an optical element for the above-mentioned brightness enhancement film, an incident light into the cholesteric liquid crystal layer from an oblique direction or an emitting light out of the layer from an oblique direction are affected with a thickness direction retardation of the cholesteric liquid crystal layer, and as a result coloring will be observed when observed from an oblique direction.

SUMMARY OF THE INVENTION

The present invention aims at providing an optical film that is obtained by applying a retardation layer to a cholesteric liquid crystal layer, that can be used as a brightness enhancement film, and further that provides an excellent visibility satisfactory also when observed not only from a front direction but from an oblique direction in image viewing displays, such as liquid crystal displays. Furthermore, the present invention aims at providing a lighting device and an image viewing displays, such as liquid crystal displays, using the optical film concerned.

Wholehearted investigation by the present inventors in order to solve the above-mentioned problems led the present inventors to find out that the object might be attained using following optical films, and the present invention was performed.

That is, the present invention relates to an optical film in which at least one layer of a cholesteric liquid crystal layer (1) and a retardation layer (2) are laminated, wherein an in-plane retardation of the retardation layer (2): $(nx_1 - ny_1) \times Dre$ is 5 nm or less,

[where, principal indices of refraction in two in-plane directions are defined as $nx_1$ and $ny_1$ (here, $nx_1 \geq ny_1$), a refractive index in a thickness direction is defined as $nz_1$, and a thickness is defined as Dre (nm)]; and a virtual thickness direction retardation: $RZch = Dch \times (ne-no)/2$ calculated from following Dch, ne, and no,

[where, an ordinary refractive index of the cholesteric liquid crystal layer (1) is defined as no, and an extraordinary refractive index is defined as ne, and a thickness of the cholesteric liquid crystal layer is defined as Dch (nm)], and a thickness direction retardation: $RZre = Dre \times (np-nz)$ calculated from Dre, np, and nz shown below,

[where, a mean value of in-plane refractive indexes of the retardation layer (2) is defined as: $np = \{(nx_1 + ny_1)/2\}$], have a relationship of $RZre/(-RZch) = 0.05$ through 0.35.

In the above-mentioned optical film of the present invention, a circular polarized light separating layer formed with a cholesteric liquid crystal layer (1) having the above-mentioned virtual thickness direction retardation: RZch, and a retardation layer (2) having the above-mentioned thickness direction retardation: RZre are combined and laminated so that a relationship of $RZre/(-RZch) = 0.05$ through 0.35 may be satisfied. When optical films being combined so that a value of $RZre/(-RZch)$ may be in the range are applied to a brightness enhancement film, a relationship of retardation values improves. As a result, satisfactory visibility may be demonstrated, even when a cholesteric liquid crystal layer (1) is applied to a brightness enhancement film and an image viewing displays, such as a liquid crystal display, are observed not only from front direction but from oblique direction. The above-mentioned value of $RZre/(-RZch)$ is more preferably 0.08 through 0.3, and still more preferably 0.1 through 0.25.

It is usually preferable that a thickness Dch (nm) of the cholesteric liquid crystal layer (1) is approximately 2000 through 30000 nm (2 through 30 μm), and is more preferable that it is 4000 through 15000 nm (4 through 15 μm). And, a virtual thickness direction retardation: $RZch = Dch \times (ne-no)/2$ is 100 through 10000 nm, preferably 500 through 8000 nm, and more preferably 1000 through 4000 nm.

A thickness Dre (nm) of the retardation layer (2) is usually approximately 100 through 200000 nm (0.1 through 200 μm), and preferably 1000 through 100000 nm (1 through 100 μm). And an in-plane retardation: $(nx_1-ny_1) \times Dre$ is 5 nm or less, and preferably 3 nm or less. Moreover, a thickness direction retardation: $RZre = Dre \times (np-nz)$ is −10 through −2000 nm, preferably −50 through −1000 nm, and more preferably −100 through −700 nm.

Moreover, the present invention relates to an optical film in which at least one retardation layer (3) whose in-plane retardation: $(nx_2-ny_2) \times d_2 = 90$ through 200 nm is further laminated to a side of the retardation layer (2) of the above-mentioned optical film, where, principal indices of refraction in two in-plane directions are defined as nx2 and ny2 (here, $nx_2 \geq ny_2$), a refractive index in a thickness direction is defined as $nz_2$, and a thickness is defined as $d_2$ (nm).

An optical film having the above-mentioned retardation layer (3) laminated thereto is useful as a brightness enhancement film. Moreover, the above-mentioned thickness $d_2$ of the retardation layer (3) is usually approximately 100 through 200000 nm (0.1 through 200 μm), and preferably 1000 through 100000 nm (1 through 100 μm). An in-plane retardation is preferably 90 through 200 nm, more preferably 100 through 180 nm, and still more preferably 110 through 150 nm.

Moreover, the present invention relates to an optical film in which an absorbing polarizing film (4) is further laminated on the retardation layer (3) of the above-mentioned optical film obtained by laminating a cholesteric liquid crystal layer (1), a retardation layer (2), and the retardation layer (3), and an optical axis of the retardation layer (3) and a transmission axis of the absorbing type polarizing film (4) intersect at an angle of 35 through 55°.

It is preferable that the absorbing polarizing film (4) is laminated so that the optical axis of the retardation layer (3) and the transmission axis of the absorbing polarizing film (4) intersect at an angle of 35 through 55° in order to improve the above-mentioned visibility. The above-mentioned angle is more preferably 40 through 50°, and still more preferably 43 through 47°.

Moreover, the present invention relates to an optical film characterized by that at least one more other optical film is further laminated to the above-mentioned optical film. Moreover, the present invention relates to a lighting device using the above-mentioned optical film. Furthermore, the present invention relates to an image viewing display in which the above-mentioned optical film or the above-mentioned lighting device is applied.

DESCRIPTION OF THE PREFERRED EMBODIMENTS

Figure 1:
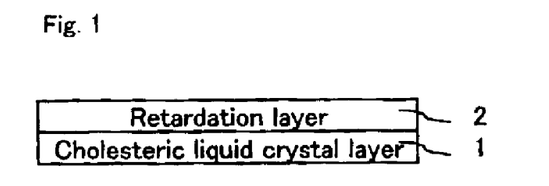
FIG. 1 is an example of an optical film of the present invention.

In an optical film of the present invention, as shown in FIG. 1, the above-mentioned cholesteric liquid crystal layer (1) and a retardation layer (2) are laminated together.

The cholesteric liquid crystal layer (1) is a circular polarized light separating layer having at least one layer of selective reflection wavelength in a visible light region. As cholesteric liquid crystal layers, a liquid crystal layer showing a characteristic that either of left-handed or right-handed circular polarized light is reflected and other light is transmitted may be mentioned. A material of oriented liquid crystal polymer, or a polymerized layer of an oriented liquid crystal monomer may form the cholesteric liquid crystal layer. Moreover, the cholesteric liquid crystal layer may be formed of these compounded layers.

The above-mentioned material of an oriented liquid crystal polymer may be obtained by orienting a cholesteric liquid crystal polymer comprising a monomer that includes optical activity group as a monomer unit. As cholesteric liquid crystal polymers, a polymer having various skeletons of a principal chain type, a side chain type, or a compounded type of them showing liquid crystal alignment with cholesteric property may be used without any limitation. A cholesteric liquid crystal layer of the present invention (1) may be formed with a liquid crystal polymer in which a low molecular chiral agent is included in a nematic based liquid crystal polymer, and a cholesteric based liquid crystal polymer in which a chiral component is introduced into a liquid crystal polymer component.

Orienting a liquid crystal monomer including a cholesteric liquid crystal monomer that includes an optical active group, and further by polymerizing the obtained oriented liquid crystal layer may form a polymerized layer of the material of an oriented liquid crystal monomer. The liquid crystal monomer is a compound having various skeletons showing liquid crystal alignment, and having at least one unsaturated double bond, such as acryloyl group, methacryloyl group, and vinyl group, and polymerizable functional group, such as epoxy group, at a terminal group. In order to improve durability of the cholesteric liquid crystal layer obtained, it is preferable that a monomer having two or more polymerizable functional groups is used as a liquid crystal monomer, and that the monomer is polymerized and simultaneously cross-linked. In addition, when a liquid crystal monomer is used, polymerization initiators are usually used with the liquid crystal monomer. As polymerization initiators, adequate polymerization initiator for a polymerization method of the liquid crystal monomer is suitably selected. As polymerization methods of the liquid crystal monomer, an ultraviolet ray polymerization method may be mentioned and in this case, for example, photo polymerization initiators may be used.

Orientation of the above-mentioned liquid crystal polymers and above-mentioned liquid crystal monomers is carried out by coating these liquid crystal polymers and liquid crystal monomers onto a surface having surface orientation function of a base material having the surface with orientation function (orientation film). As oriented films, various kinds of films conventionally known, for example: films formed by a method that a thin film comprising polyimides, and polyvinyl alcohol, etc. is formed on a transparent base material, and subsequently rubbing treatment is given thereto; stretched films obtained by a method of stretching a transparent film; films formed by a method that polarized ultraviolet ray is irradiated to a polymer having cinnamate skeleton and azobenzene skeleton, or polyimide may be used. In addition, transparent base materials used for formation of oriented film are not especially limited if they are materials that are not affected at temperatures for orientation of the above-mentioned material, and for example, single-layered or multi-layered various plastics films, glass plates, metals etc. may be used. Orientation of the above-mentioned liquid crystal polymers and liquid crystal monomers is usually carried out by heat treatment. Orientation is fixed by being cooled after the heat treatment.

Moreover, one or more kinds of additives, such as polymers other than the above-mentioned liquid crystal polymers, and inorganic compounds, such as stabilizers and plasticizers, organic compounds, metals and compounds thereof, may be blended to the cholesteric liquid crystal layer, if needed.

Besides, a layer reflecting circular polarized light over a wide wavelength ranges, such as in a visible light region, may be obtained adopting an arranged structure having two or more of layers that are obtained by combining layers having different reflecting wave lengths as cholesteric liquid crystal layers, and thus obtained liquid layer may provide a transmitted circular polarized light over a wide wavelength range.

As the retardation layer (2), a layer may be used without any limitation in which an in-plane retardation of the retardation layer (2): $(nx_1-ny_1) \times Dre$ is 5 nm or less, [where, principal indices of refraction in two in-plane directions are defined as $nx_1$ and $ny_1$ (here, $nx_1 \geq ny_1$), a refractive index in a thickness direction is defined as $nz_1$, and a thickness is defined as Dre (nm)]; and a virtual thickness direction retardation of the cholesteric liquid crystal layer (1): RZch= Dch×(ne−no)/2, and a thickness direction retardation: RZre= Dre×(np−nz) of the retardation layer (2) have a relationship of RZre/(−RZch)=0.05 through 0.35.

The retardation layer (2) may be formed, for example, of homeotropic orienting property liquid crystal polymers. As the liquid crystal polymer concerned, for example, side chain type liquid crystal polymers including a monomer unit (a) including a liquid crystalline fragment side chain having positive refractive index anisotropy, and a monomer unit (b) including non-liquid crystalline fragment side chain may be mentioned. Even if vertical alignment film is not used for it, the above-mentioned side chain type liquid crystal polymer shows liquid crystal state by heat treatment, may demonstrate nematic liquid crystal phase and may show homeotropic orientation.

The above-mentioned monomer unit (a) is a unit having a side chain that has nematic liquid crystalline property, and, for example, a monomer unit represented by a general formula (a) may be mentioned:

(a)

(Where, $R^1$ represents a hydrogen atom or a methyl group, a represents a positive integer of 1 through 6, $X^1$ represents —$CO_2$-group or —OCO-group, $R^2$ represents a cyano group, an alkoxy group of carbon numbers of 1 through 6, a fluoro group, or an alkyl group of carbon numbers of 1 through 6, and b and c represent integers of 1 or 2).

Besides, the monomer unit (b) is a monomer unit having a linear side chain, and, for example, a monomer unit represented by a general formula (b) may be mentioned:

(b)

(Where, $R^3$ represents a hydrogen atom or a methyl group, $R^4$ represents an alkyl group of carbon numbers of 1 through 22, a fluoro alkyl group of carbon numbers of 1 through 22, or a group represented by a general formula (b1):

(b1)

where, d represents a positive integer of 1 through 6, or $R^5$ an alkyl group of carbon numbers of 1 through 6).

Moreover, a percentage of the monomer unit (a) and the monomer unit (b) is not especially limited, but is dependent on a kind of the monomer units. Since the side chain type liquid crystal polymer fails to demonstrate liquid crystalline mono domain orientation property when a percentage of the monomer unit (b) increases, the percentage is preferably (b)/{(a)+(b)}=0.01 through 0.8 (molar ratio). Especially, it is more preferable 0.1 through 0.5.

And, as homeotropic orienting property liquid crystal polymer, a side chain type liquid crystal polymer including the above-mentioned monomer unit (a) that includes a liquid crystalline fragment side chain, and a monomer unit (c) including a liquid crystalline fragment side chain having an alicyclic cyclic structure may be mentioned.

The above-mentioned monomer unit (c) is a unit having a side chain that has a nematic liquid crystalline property, and, for example, a monomer unit represented by a general formula (c) may be mentioned:

(Where, $R^6$ represents a hydrogen atom or a methyl group, h represents a positive integer of 1 through 6, $X^2$ represents —$CO_2$-group or —OCO-group, e and g represent integers of 1 or 2, f represents an integer of 0 through 2, and $R^7$ represents a cyano group or an alkyl group of carbon numbers of 1 through 12).

Moreover, a percentage of the monomer unit (a) and the monomer unit (c) is not especially limited, but is dependent on a kind of the monomer units. Since the side chain type liquid crystal polymer fails to demonstrate liquid crystalline mono domain orientation property when a percentage of the monomer unit (c) increases, the percentage is preferably (c)/{(a)+(c)}=0.01 through 0.8 (molar ratio). Especially, it is more preferable 0.1 through 0.6.

Homeotropic orienting property liquid crystal polymers are not limited to polymers having the above-mentioned monomer unit, and the above-mentioned illustrated monomer units may be suitably combined.

A weight average molecular weight of the above-mentioned side chain type liquid crystal polymer is preferably 2000 through 100,000. Performance as a liquid crystal polymer is demonstrated by adjusting the weight average molecular weight within this range. Since there is shown a tendency that poor film-forming property of an orientation layer may be demonstrated when a weight average molecular weight of the side chain type liquid crystal polymer is excessively small, it is more preferable that the weight average molecular weight is 2500 or more. On the other hand, since there is tendency that orientation property as a liquid crystal becomes poor, and therefore uniform orientation state becomes difficult to be formed when the weight average molecular weight is excessively large, it is preferable that the weight average molecular weight is 50,000 or less.

Besides, the above-mentioned side chain type liquid crystal polymer may be prepared by copolymerizing acryl based monomers or methacryl based monomers corresponding to the above-mentioned monomer unit (a), monomer unit (b), and monomer unit (c). Furthermore, the monomers corresponding to the monomer unit (a), the monomer unit (b), and the monomer unit (c) may be synthesized using well-known methods. Preparation of copolymers may be carried out according to usual polymerization methods for acryl based monomers, such as a radical polymerization method, a cationic polymerization method, and an anionic polymerization method, etc. Furthermore, various kinds of polymerization initiators are usable when a radical polymerization method is applied, and among them, polymerization initiators decomposing at temperatures within an intermediate temperature range, not excessively high or low, may be preferably used, such as azobisisobutyronitrile and benzoyl peroxide.

Liquid crystalline compositions may be obtained by blending photo polymerizable liquid crystalline compounds to the above-mentioned side chain type liquid crystal polymer. It is preferable to use homeotropic orientation liquid crystalline compositions including photo polymerizable liquid crystalline compounds in these liquid crystal films, in order to improve durability for use of liquid crystal displays etc. Homeotropic orientation liquid crystalline compositions are oriented, and fixed, and, subsequently given optical irradiation with ultraviolet ray etc.

Photo polymerizable liquid crystalline compounds are liquid crystalline compounds having at least one unsaturated double bond, such as acryloyl group or methacryloyl group, as photo polymerizable functional groups, and nematic liquid crystalline compounds are preferably used. As this photo polymerizable liquid crystalline compounds, acrylates and methacrylates that give the above-mentioned monomer unit (a) may be illustrated. As photo polymerizable liquid crystalline compounds, in order to improve durability, compounds having two or more photo polymerizable functional groups are preferable. As such photo polymerizable liquid crystalline compounds, cross linked type nematic liquid crystal monomers represented by a following general formula (d) may be illustrated:

(Where, R represents a hydrogen atom or a methyl group, A and D independently represent 1,4-phenylene group or 1,4-cyclohexylene group, respectively, X independently represents —COO-group, —OCO-group, or —O-group, respectively, B represents 1,4-phenylene group, 1,4-cyclohexylene group, 4,4'-biphenylene group, or 4,4-bicyclohexylene group, and m and n independently represent an integer of 2 through 6, respectively). Moreover, as photo polymerizable liquid crystalline compounds, compounds may be illustrated in which "$H_2C{=}CR{-}CO_2{-}$" at terminal group in the above-mentioned general formula (d) is substituted by a vinyl ether group or an epoxy group, and in which "—$(CH_2)_m$—" and/or "—$(CH_2)_n$—" are substituted by "—$(CH_2)_3$—$C^*H(CH_3)$—$(CH_2)_2$—" or "—$(CH_2)_2$—$C^*H(CH_3)$—$(CH_2)_3$—".

The above-mentioned photo polymerizable liquid crystalline compounds may be given liquid crystal state to form, for example, a nematic liquid crystal layer, and may be oriented together with side chain type liquid crystal polymers. Subsequently the photo polymerizable liquid crystalline compounds are polymerized or cross linked, and thus durability of birefringent films obtained may be improved.

A percentage of a photo polymerizable liquid crystalline compounds and a side chain type liquid crystal polymer in a liquid crystalline composition is not especially limited, and it is suitably determined in consideration of durability etc. of a birefringent film obtained. Usually, it is preferably approximately (photo polymerizable liquid crystalline compound): (side chain type liquid crystal polymer) (weight ratio)=0.1:1 through 30:1, more preferably 0.5:1 through 20:1, and still more preferably 1:1 through 10:1.

In the above-mentioned liquid crystalline composition, photo polymerization initiators may usually be included. Various kinds of photo polymerization initiators may be used without any limitation. As photo polymerization initiators, for example, Irgacure 907, Irgacure 184, Irgacure 651, Irgacure 369 etc. manufactured by Ciba Specialty Chemicals may be illustrated. The amount of addition of the photo polymerization initiator is controlled to an amount that does not disturb homeotropic orientation of the liquid crystalline composition in consideration of a kind of the photo polymerization liquid crystal compound used, a compounding ratio of the liquid crystalline composition used, etc. Usually, it is preferably approximately 0.5 through 30 parts by weight to the photo polymerizable liquid crystalline compound 100 parts by weight.

The retardation layer (2) is manufactured in a method that the above-mentioned liquid crystal polymer is coated on a substrate having a vertical alignment film, such as lecithin, applied thereto, if needed, then the liquid crystal polymer concerned is homeotropicaly oriented in liquid crystal state, and the orientation state is fixed while the orientation is maintained. Moreover, when using a liquid crystalline composition including the above-mentioned side chain type liquid crystal polymer and the above-mentioned photo polymerizable liquid crystalline compound, the composition is coated onto an orientation substrate, subsequently the liquid crystalline composition concerned is homeotropicaly oriented in liquid crystal state, and the orientation state is fixed while the orientation is maintained.

As methods for coating the above-mentioned liquid crystal polymer or the liquid crystalline composition to an orientation substrate, a solution coating method using a solution in which the liquid crystal polymer or the liquid crystalline composition concerned is dissolved in a solvent, or a molten coating method in which the liquid crystal polymer or the liquid crystalline composition concerned is coated in molten state may be mentioned. Among them, the solution coating method is preferable in which the solution of the liquid crystal polymer or the liquid crystalline composition is coated onto an orientation substrate.

Solvents used when preparing the above-mentioned solution are dependent on kinds of liquid crystal polymers, photo polymerizable liquid crystalline compounds, or substrates, and usually, among examples of solvents that may be used are: halogenated hydrocarbons, such as chloroform, dichloromethane, dichloroethane, tetrachloroethane, trichloroethylene, tetrachloroethylene, and chlorobenzene; phenols, such as phenol and parachlorophenol; aromatic hydrocarbons, such as benzene, toluene, xylene, methoxybenzene, 1,2-dimethoxy benzene; and others, such as, acetone, ethyl acetate, tert-butyl alcohol, glycerol, ethylene glycol, triethylene glycol, ethylene glycol monomethyl ether, diethylene glycol dimethyl ether, ethyl cellosolve, butyl cellosolve, 2-pyrolidone, N-methyl-2-pyrrolidone, pyridine, triethylamine, tetrahydrofuran, dimethylformamide, dimethylacetamide, dimethyl sulfoxide, acetonitrile, butyronitrile, carbon disulfide, cyclohexanone, etc. A concentration of the solution is greatly dependent on solubility of the liquid crystal polymer or the liquid crystalline composition, or on a film thickness of an oriented liquid crystal layer finally obtained, and it is usually in a range of 3 through 50% by weight, and preferably of 7 through 30% by weight.

Since a film thickness of a retardation layer (2) finally obtained is mostly determined in a stage where coating is carried out onto a substrate, if the film thickness of the retardation layer (2) formed from the above-mentioned liquid crystal polymer or liquid crystalline composition needs to be precisely controlled, a control of the concentration of the solution, the film thickness of a coated film, etc. needs to be especially carefully carried out.

As methods for coating onto orientation substrate the solution of the liquid crystal polymer or the liquid crystalline composition that is adjusted to a desired concentration using the above-mentioned solvent, for example, a roll coating method, a photogravure coating method, a spin coating method, a bar coating method, etc. are employable. The solvent is removed after coated and a liquid crystal polymer layer or a liquid crystalline composition layer is formed on the substrate. Removal conditions of the solvent are not especially limited, and any kind of conditions may be adopted, if the solvent can be removed in general, and if only the liquid crystal polymer layer or the liquid crystalline composition layer does not flows off or drips down. Usually, solvent are removed using methods, such as a method of drying at room temperature, a method of drying in a baking furnace, and a method of heating on a hot plate.

Subsequently, the liquid crystal polymer layer or the liquid crystalline composition layer formed on the orientation substrate is made to give a liquid crystal state and is oriented. That is, for example, heat treatment is given so that the liquid crystal polymer or the liquid crystalline composition may -be in a liquid crystal temperature region, and may be oriented in a liquid crystal state. As heat treatment methods, a similar method as the above-mentioned dry method is employable. Heat treatment temperatures are greatly dependent on the liquid crystal polymer or the liquid crystalline composition used, and a kind of the orientation substrate used, and usually it is in a range of 60 through 300° C., and preferably in a range of 70 through 200° C. Moreover, a heat treatment period is greatly dependent on the heat treatment temperatures, and the liquid crystal polymer or the liquid crystalline composition and a kind of the orientation substrate to be used, usually, it is selected in a range of 10 seconds through 2 hours, and preferably in a range of 20 seconds through 30 minutes.

Cooling operation is carried out after heat treatment. The cooling operation may be carried out in a method that a birefringent film after heat treatment is removed from a heating atmosphere used for heat treatment operation into a room temperature atmosphere. Moreover, this cooling operation may be carried out using compulsive coolings, such as with air cooling and water cooling. The above-mentioned liquid crystal polymer is cooled below at a glass transition temperature of the liquid crystal polymer, and the orientation is fixed.

In case of the liquid crystalline composition, light is irradiated, and the photo polymerizable liquid crystalline compound is polymerized of cross-linked. Light irradiation is carried out by, for example, ultraviolet ray. It is preferable that the ultraviolet irradiation may be carried out in an inert gas atmosphere in order to sufficiently promote a reaction. Usually, a high pressure mercury ultraviolet lamp having an illumination of approximately 80 through 160 mW/cm$^2$ is typically used. Other kind lamps, such as metal halide UV lamp and incandescent lamp, may also be used. Furthermore, adjustment, such as, cold mirror method, water cooling method, other cooling processings, or regulation of line speed, may be suitably adopted so that the liquid crystal layer surface temperature may be in a liquid crystal temperature at the time of ultraviolet irradiation.

The retardation layer (2) thus obtained is separated or not separated from the substrate to be used.

Figure 2:
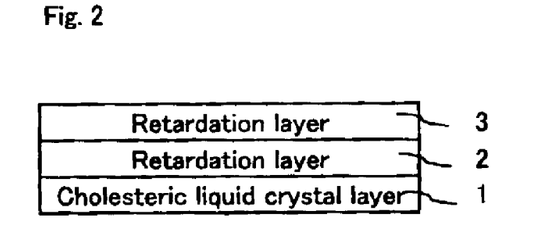
FIG. 2 is an example of an optical film of the present invention.

A retardation layer (3) showing a relationship of in-plane retardation: $(nx_2-ny_2) \times d_2 = 90$ through 200 nm may be laminated on the retardation layer (2) side of the optical film shown in the above-mentioned FIG. 1, where principal indices of refraction in two in-plane directions are defined as $nx_2$ and $ny_2$ (here, $nx_2 \geq ny_2$), respectively, as shown in FIG. 2, a refractive index in a thickness direction is defined as $nz_2$, and a thickness is defined as $d_2$ (nm). The retardation layer (3) usually has a refractive index showing a relationship of $nx_2 > ny_2 > nz_2$.

As this retardation layers (3), for example, a retardation plate used for the purpose of compensation for coloring, or visual angle, etc. owing to various kinds of birefringences caused by wavelength plates or liquid crystal layers may be used. Moreover, two or more kinds of retardation plates having suitable retardation corresponding to purposes for usage may be laminated, and thus optical properties, such as retardation, may be controlled. As retardation plates, there may be mentioned: stretched films having birefringence property comprising suitable polymers, such as, polycarbonates, norbornene derived resins, polyvinyl alcohols, polystyrenes, polymethylrnethacrylates, polypropylenes and other polyolefins, polyallylates, and polyamides; oriented film comprising liquid crystal materials, such as liquid crystal polymer; films having a constitution in which oriented layer of liquid crystal materials is supported with another film.

Furthermore, for example, retardation plates having functions as a quarter wavelength plate over a wide wavelength ranges, such as in a visible light region, may be obtained in a method of superimposing a retardation layer having a function as quarter wavelength plate to monochromatic light with a wavelength of 550 nm, to a retardation layer showing other retardation characteristics, for example, a retardation layer having functions as a half wavelength plate. Accordingly, the retardation layer (3) may be layers comprising retardation layers of one layer or two or more layers.

Figure 3:
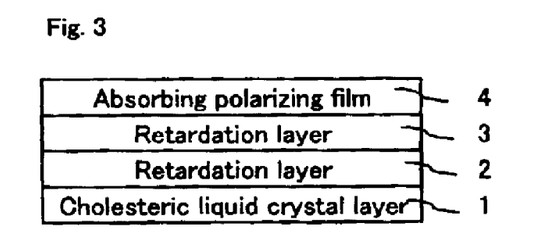
FIG. 3 is an example of an optical film of the present invention.

When used for liquid crystal display, usually, a polarized light separation layer comprising an absorbing type polarizing film (4) is laminated onto an optical film having the above-mentioned cholesteric liquid crystal layer (1), retardation layer (2), and retardation layer (3) laminated thereto, as is shown in FIG. 3. And, the retardation layer (3) and the absorbing type polarizing film (4) are preferably arranged so that an optical axis of the retardation layer (3) and a transmission axis of the absorbing type polarizing film (4) may make an angle of 35 through 55°.

The above-mentioned polarizing film (polarizer) is not especially limited, but various kinds may be used. And polarizers are usually used as polarizing plates having protective film or films on one side or on both sides. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 $\mu$m is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a material forming the protective film prepared in one side or both sides of the above-mentioned polarizer, with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned. Generally, thickness of the protective film is no more than 500 $\mu$m, preferably 1 to 300 $\mu$m and more preferably 5 to 200 $\mu$m.

As a transparent protection film, if polarization property and durability are taken into consideration, cellulose based polymer, such as triacetyl cellulose, is preferable, and especially triacetyl cellulose film is suitable. In addition, when transparent protection films are provided on both sides of the polarizer, transparent protection films comprising same polymer material may be used on both of a front side and a back side, and transparent protection films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imide group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protection film may have as little coloring as possible. Accordingly, a protection film having a phase difference value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protection film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

The above described polarizer and the protective film are usually adhered through aqueous adhesives etc. As aqueous adhesives, polyvinyl alcohol based adhesives, gelatin based adhesives, vinyl based latex based, aqueous polyurethanes, aqueous polyesters, etc. may be illustrated.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Other types of optical films may be further laminated to the optical films shown in the above-mentioned FIG. 1, FIG. 2, or FIG. 3. The optical films of other type may be arranged between layers of the above-mentioned optical films, or to an outermost layer thereof.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

Viewing angle compensation films may be mentioned as other type of optical films. Viewing angle compensation films are used in order to extend viewing angles and for images to be shown comparatively vividly, when a screen of a liquid crystal display is observed in a little oblique direction, not in a perpendicular direction to the screen.

As such a viewing angle compensation retardation plate, in addition, bi-directionally stretched films, such as films having birefringence in which biaxial-stretching processing or stretching processing in two perpendicularly intersecting directions etc. is given, and inclined-stretched film etc. may be used for others. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. Viewing angle compensation films may be suitably combinable for the purpose of inhibition of coloring by variation of viewing angle based on retardation by a liquid crystal cell etc. and of expanding of viewing angle for satisfactory visual recognition.

Besides, a compensation plate in which an optical anisotropy layer consisting of an orientation layer of liquid crystal polymer, especially consisting of an inclined orientation layer of discotic liquid crystal polymer is supported with triacetyl cellulose film may preferably be used from a viewpoint of attaining a wide viewing angle with good visibility.

An optical layer used in practical use is especially no limitation, one layer or two layers or more of optical layers, which may be used for formation of a liquid crystal display etc., such as a reflector, and a transreflector, may be used. Especially preferable polarizing plates are; a reflection type polarizing plate or a transreflective type polarizing plate in which a reflector or a transreflector is further laminated onto a polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a tranreflective type polarizing plate may be obtained by preparing the above-mentioned reflective layer as a transreflective type reflective layer, such as a half-mirror etc. that reflects and transmits light. A transreflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transreflective type polarizing plate. That is, the transreflective type polarizing plate is useful to obtain of a liquid crystal display of the type that saves energy of light sources, such as a back light, in a well-lighted atmosphere, and can be used with a built-in light source if needed in a comparatively dark atmosphere etc.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

In the above-mentioned optical film, each optical film is laminated together. Although the optical films may be formed using methods in which they are laminated sequentially and separately in a manufacturing process of liquid crystal displays, films that are beforehand laminated and constituted as an optical film are superior in stability of quality, laminating work, etc., thus leading to advantages of improved manufacturing processes for liquid crystal displays.

Adhesive layer may also be provided in an optical film of the present invention. A pressure sensitive adhesive layer may be used for attachment to a liquid crystal cell, and also it may be used for laminating of an optical film. On the occasion of adhesion of the above described optical film, the optical axes may be set so that a proper arrangement angle may be given according to required phase difference characteristics.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the lighting device, an optical film of the present invention is used is preferable. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Figure 4:
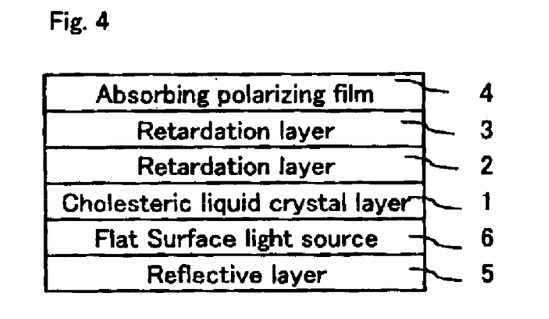
FIG. 4 is an example of a lighting device of the present invention.

A lighting system is preferably a lighting device such that a circular polarized light separating layer (1) of an optical film of the present invention may face to a surface side of a flat surface light source (6) having a reflective layer (5) in a back side of a light emitting surface, as is shown in FIG. 4. And, in the above-mentioned lighting device it is preferable to provide at least prism array layer between the circular polarized light separating layer (1) and the flat surface light source (6) side. Moreover, the prism array preferable has a constitution where alignment directions of upper and lower layers comprising two or more of prism array may intersect together. Moreover, the liquid crystal display preferably has a structure of having liquid crystal cell in light emitting side of the lighting device.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent electrode and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLE

Although the present invention will hereinafter be described in detail with reference to Examples, the present invention is not limited by the Examples. In addition, a thickness of each layer was measured using MCPD-2000 (interference method) manufactured by Otsuka Electronics Co., Ltd. In addition, each retardation was measured using automatic birefringence measuring apparatus KOBRA-21ADH (parallel Nicols rotating method) manufactured by Oji Scientific Instruments.

(Formation of Cholesteric Liquid Crystal Layer (1))

Manufacturing Example 1

An oriented film of polyvinyl alcohol having a thickness of 0.1 μm was formed on a triacetylcellulose (TAC) film having a thickness of 50 μm, and rubbing treatment was given. After three layers having 700 nm, 550 nm, and 400 nm of central wavelengths of selective reflection, respectively, were sequentially formed on the oriented film, using an acryl based cholesteric liquid crystal polymer with side chain, then oriented, and finally the layers obtained was changed into a thin film. A thickness of each layer showed 3 μm. As the cholesteric liquid crystal polymer of acryl based with side chain, a polymer having repeating unit represented by a following general formula (1), and having a temperature showing liquid crystal property of 90 through 200° C. (glass transition temperature: 90° C.) was used.

(1)

Formation of the cholesteric liquid crystal layer was carried out in a method that the above-mentioned cholesteric liquid crystal polymer diluted with a solvent by about 25% by weight of concentration was applied, the solvent was evaporated off, and the layer was then heated at 160° C. to orient the liquid crystal, and subsequently, the liquid crystal thus obtained was cooled at room temperature so that it might become under a glass transition temperature thereof. In this case, cyclohexanone was used as a solvent. Immediately after application of a second and third layers, 25° C. (room temperature) of air was blown to quickly evaporate the solvent, and thereby mixing between layers was controlled as little as possible. Thus, cholesteric liquid crystal layer A was formed. The cholesteric liquid crystal layer A showed $\{(ne-no)/2\}=0.15$.

Manufacturing Example 2

In the manufacturing example 1, except having used a polymer having a repeating unit represented by a following general formula (2) as a cholesteric liquid crystal polymer, a similar method as the manufacturing example 1 was repeated, and a cholesteric liquid crystal layer B having a thickness of Dch (nm) was formed.

(2)

The cholesteric liquid crystal layer B showed $\{(ne-no)/2\}= 0.20$.

Manufacturing Example 3

In the manufacturing example 1, Except having used a polymer having repeating unit represented by a following general formula (3) as a cholesteric liquid crystal polymer, a similar method as the manufacturing example 1 was repeated, and a cholesteric liquid crystal layer C having a thickness of Dch (nm) was formed.

(3)

The cholesteric liquid crystal layer C showed {(ne−no)/2}= 0.25.

(Formation of Retardation Layer (2))

Manufacturing Example 4

A side chain type liquid crystal polymer represented by a following general formula (4) was dissolved in cyclohexanone so that about 20% by weight of concentration might be given.

(4)

(where, x and y show mole % of monomer units, and x=50 and y=50. They are expressed in block moiety for convenience, and have weight average molecular weights of 5000). Subsequently, the solution concerned was applied on a polyethyleneterepthalate film on which lecithin (vertical alignment film) having a thickness of 75 µm had been applied. The solvent was evaporated off, and then the film was heated at 120° C. to orient the liquid crystal. The film thus obtained was radiationally cooled at room temperature and a retardation layer having a thickness Dre (nm) was formed. Retardation layer A showed $nz_1 > nx_1 \geq ny_1$, an in-plane retardation: $(nx_1-ny_1) \times Dre = 3$ nm, and $np-nz_1 = -0.003$.

Manufacturing Example 5

Except having used a polymer having x=60 and y=40 as a side chain type liquid crystal polymer represented by the general formula (4) in manufacturing example 4, a similar method as in manufacturing example 4 was repeated, and a retardation layer B having a thickness Dre (nm) was formed. Retardation layer A showed $nz_1 > nx_1 \geq ny_1$, an in-plane retardation: $(nx_1-ny_1) \times Dre = 3$ nm, and $np-nz_1 = -0.02$.

Manufacturing example 6

Except having used a polymer having x=65 and y=35 as a side chain type liquid crystal polymer represented by the general formula (4) in manufacturing example 4, a similar method as in manufacturing example 4 was repeated, and a retardation layer C having a thickness Dre (nm) was formed. Retardation layer C showed $nz_1 > nx_1 \geq ny_1$, an in-plane retardation: $(nx_1-ny_1) \times Dre = 3$ nm, and $np-nz_1 = -0.13$.

(Formation of Retardation Layer (3))

A stretched film having a thickness of 80 µm (80000 nm) made of polycarbonate was used. This film showed an in-plane retardation of $(nx_2-ny_2) \times d_2 = 140$ nm.

Comparative Examples 1 through 3 and Examples 1 through 3.

The cholesteric liquid crystal layers (1), and the retardation layers (2) were laminated through acryl based pressure sensitive adhesive layers, as are shown in FIG. 1 to produce optical films. Table 1 shows kinds and thicknesses of the cholesteric liquid crystal layers (1) and the retardation layers (2).

A retardation layer (3) was laminated onto the retardation layer (2) of the obtained optical film obtained as is shown FIG. 2, and furthermore, as is shown in FIG. 3, a polyvinyl alcohol film in which iodine had been absorbed was laminated as an absorbing type polarizing film (4) onto the retardation layer (3), through acryl based pressure sensitive adhesive layers, respectively, so that an optical axis of the retardation layer (3) and a transmission axis of the absorbing type polarizing film (4) might make an angle of 45°, and optical films were obtained.

The optical films obtained described above were arranged so that the cholesteric liquid crystal layer (1) might be arranged on a flat surface light source having a reflective layer, as is shown in FIG. 4, and the lighting devices were obtained. The liquid crystal display having a liquid crystal cell arranged thereto in a light emitting side (a side of the absorbing type polarizing film (4)) of this lighting device was evaluated for a hue observed in an oblique direction. Evaluation of a hue observed in an oblique direction was carried out by visual inspection. Table 1 shows results.

TABLE 1

| | Cholesteric liquid crystal layer (1) | | | Retardation layer (2) | | | Hue observed |
| --- | --- | --- | --- | --- | --- | --- | --- |
| | Kind | Thickness: Dch (μm) | RZch (nm) | Kind | Thickness: Dre (μm) | RZre (nm) | RZre/ (−RZch) | in an oblique direction |
| Comparative Example 1 | A | 16 | 2400 | B | 50 | −1000 | 0.42 | Yellow |
| Comparative Example 2 | A | 11 | 1650 | C | 6 | −780 | 0.47 | Yellow |
| Comparative Example 3 | C | 9 | 2250 | A | 30 | −90 | 0.04 | Purple |
| Example 1 | A | 9 | 1350 | A | 90 | −270 | 0.20 | White |
| Example 2 | B | 12 | 2400 | C | 4 | −520 | 0.17 | White |
| Example 3 | C | 15 | 3750 | C | 4 | −520 | 0.11 | White |

What is claimed is:

1. An optical film in which at least one layer of a cholesteric liquid crystal layer (1) and a retardation layer (2) are laminated, wherein an in-plane retardation of the retardation layer (2): $(nx_1-ny_1) \times Dre$ is 5 nm or less, a virtual thickness direction retardation: $RZch = Dch \times (ne-no)/2$ calculated from following Dch, ne, and no, a thickness direction retardation: $RZre = Dre \times (np-nz)$ calculated from Dre, np, and nz shown below, have a relationship of $RZre/(-RZch) = 0.05$ through $0.35$.

2. An optical film in which at least one retardation layer (3) whose in-plane retardation: $(nx_2-ny_2) \times d_2 = 90$ through $200$ nm is further laminated to a side of the retardation layer (2) the optical film according to claim 1, where, principal indices of refraction in two in-plane directions are defined as $nx_2$ and $ny_2$ (here, $nx_2 \geq ny_2$), a refractive index in a thickness direction is defined as $nz_2$, and a thickness is defined as $d_2$ (nm).

3. An optical film in which an absorbing polarizing film (4) is further laminated on a side of a retardation layer (3) of the optical film according to claim 2 so that the optical axis of the retardation layer (3) and the transmission axis of the absorbing polarizing film (4) intersect at an angle of 35 through 55°.

4. An optical film in which at least one layer of other optical film is further laminated to the optical film according to claim 3.

5. A lighting device using the optical film according to claim 3.

6. An image viewing display in which the optical film according of the lighting device according to claim 5 is applied.

7. An image viewing display in which the optical film according of claim 3 is applied.

8. An optical film in which at least one layer of other optical film is further laminated to the optical film according to claim 2.

9. A lighting device using the optical film according to claim 2.

10. An image viewing display in which the optical film according of the lighting device according to claim 9 is applied.

11. An image viewing display in which the optical film according of claim 2 is applied.

12. An optical film in which at least one layer of other optical film is further laminated to the optical film according to claim 1.

13. A lighting device using the optical film according to claim 1.

14. An image viewing display in which the optical film according of the lighting device according to claim 13 is applied.

15. An image viewing display in which the optical film according of claim 1 is applied.

* * * * *